United States Patent
Chang

(10) Patent No.: US 9,446,558 B2
(45) Date of Patent: *Sep. 20, 2016

(54) THREE-DIMENSIONAL PRINTING APPARATUS AND PRINTING HEAD MODULE

(71) Applicants: XYZprinting, Inc., New Taipei (TW); Kinpo Electronics, Inc., New Taipei (TW); Cal-Comp Electronics & Communications Company Limited, New Taipei (TW)

(72) Inventor: Chia-Ming Chang, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 249 days.

This patent is subject to a terminal disclaimer.

(21) Appl. No.: 14/180,337

(22) Filed: Feb. 13, 2014

(65) Prior Publication Data

US 2015/0165682 A1 Jun. 18, 2015

(30) Foreign Application Priority Data

Dec. 13, 2013 (TW) .............................. 102146237 A

(51) Int. Cl.
*B29C 67/00* (2006.01)
*B33Y 10/00* (2015.01)
(Continued)

(52) U.S. Cl.
CPC ....... *B29C 67/0085* (2013.01); *B29C 67/0059* (2013.01); *B29C 67/0088* (2013.01); *B33Y 10/00* (2014.12); *B33Y 30/00* (2014.12); *B33Y 50/02* (2014.12)

(58) Field of Classification Search
CPC .......... B29C 67/0085; B29C 67/0088; B29C 67/0059
USPC ....................................................... 425/375
See application file for complete search history.

(56) References Cited

U.S. PATENT DOCUMENTS 3,264,685 A * 8/1966 Boggild ............... A63H 33/001
29/434
3,940,226 A * 2/1976 Verhoeven ............. A21C 11/16
425/375

(Continued)

FOREIGN PATENT DOCUMENTS

CN 101884573 11/2010
CN 102319126 1/2012

OTHER PUBLICATIONS

"Office Action of China Counterpart Application", issued on Jun. 6, 2016, p. 1-p. 8.

Primary Examiner — Yogendra Gupta
Assistant Examiner — Emmanuel S Luk
(74) Attorney, Agent, or Firm — Jianq Chyun IP Office

(57) ABSTRACT

A three-dimensional (3-D) printing apparatus including a base, a printing head module and a control unit is provided. The base has a carrying surface. The printing head module is disposed above the base. The printing head module includes a body and a discharge outlet switching component. The body includes a material supplying channel. The discharge outlet switching component is movably disposed at the body. The discharge outlet switching component includes a plurality of discharge outlets. Diameters of the discharge outlets are different from each other. The control unit is configured to choose one of the discharge outlets according to the diameters and connect the chosen discharge outlet to the body, such that the material supplying channel is connected to the corresponding discharge outlet.

23 Claims, 5 Drawing Sheets

(51) Int. Cl.
*B33Y 30/00* (2015.01)
*B33Y 50/02* (2015.01)

(56) References Cited

U.S. PATENT DOCUMENTS

| | | | | |
|---|---|---|---|---|
| 4,569,815 | A * | 2/1986 | Rentz | A63H 33/001 |
| | | | | 264/310 |
| 4,913,645 | A * | 4/1990 | Daouse | A21C 3/08 |
| | | | | 118/323 |
| 7,275,924 | B1 * | 10/2007 | Kreuzer | B29C 47/0002 |
| | | | | 425/169 |
| 8,926,484 | B1 * | 1/2015 | Comb | B29C 67/0085 |
| | | | | 425/162 |
| 9,073,366 | B1 * | 7/2015 | Din | B41J 11/04 |
| 2001/0017085 | A1 * | 8/2001 | Kubo | B41J 2/01 |
| | | | | 101/35 |
| 2005/0015173 | A1 * | 1/2005 | Ohmori | B29C 67/0088 |
| | | | | 700/119 |
| 2005/0248065 | A1 * | 11/2005 | Owada | B29C 67/0055 |
| | | | | 264/494 |
| 2006/0127153 | A1 * | 6/2006 | Menchik | B29C 67/0059 |
| | | | | 400/62 |
| 2015/0017271 | A1 * | 1/2015 | Donaldson | B29C 67/0059 |
| | | | | 425/171 |
| 2015/0140147 | A1 * | 5/2015 | Konstantinos | B33Y 30/00 |
| | | | | 425/131.1 |
| 2015/0176956 | A1 * | 6/2015 | Pettersson | G01B 21/04 |
| | | | | 33/503 |
| 2015/0283751 | A1 * | 10/2015 | O'Neil | B29C 47/043 |
| | | | | 264/308 |

* cited by examiner

THREE-DIMENSIONAL PRINTING APPARATUS AND PRINTING HEAD MODULE

CROSS-REFERENCE TO RELATED APPLICATION

This application claims the priority benefit of Taiwan application serial no. 102146237, filed on Dec. 13, 2013. The entirety of the above-mentioned patent application is hereby incorporated by reference herein and made a part of this specification.

BACKGROUND

1. Technical Field

The technical field relates to a printing apparatus and a printing head module thereof, and more particularly, to a three-dimensional printing apparatus and a printing head module thereof.

2. Description of Related Art

With the advance in computer-aided manufacturing (CAM), rapid prototyping (RP) has been developed by manufacturing industries, which can rapidly fabricate original concept designs. A RP technology may provide geometric shapes with limitations, and excellence of the RP technology is better demonstrated in more complex components. Moreover, manpower and processing time can be greatly reduced, and designed components on 3-D computer-aided design (CAD) can be realistically rendered in a short amount of time. Not only can the components be touched, but the geometric curves thereof can also be truly appreciated. Moreover, the assembly ability of the components can be tested, and even functional tests may be performed thereto.

A number of RP methods are available, such as fused deposition modeling (FDM) and laminated object manufacturing (LOM) and so on. However, in a three-dimensional printing apparatus currently using said RP methods for forming 3-D objects, a printing head thereof includes only one nozzle. Also, the nozzle usually requires to be smaller in diameter so that the 3-D object may achieve a standard of high resolution. Accordingly, the printing head usually takes longer time for extrusion molding a building material on a base through the nozzle, such that 3-D printing speed of the three-dimensional printing apparatus may lowered, resulting in poor efficiency of 3-D printing. Therefore, current three-dimensional printing apparatuses are still very inconvenient to use, which not only wastes manpower, but also limits the variation and flexibility of fabricated three-dimensional objects.

SUMMARY

One of exemplary embodiments is directed to a three-dimensional printing apparatus having a printing head module which may switch between discharge outlets with different diameters according to printing requirements, so as to improve the efficient of 3-D printing.

One of exemplary embodiments provides a three-dimensional printing apparatus capable of switching between discharge outlets with different diameters based on printing requirements, so as to improve the efficient of 3-D printing.

The three-dimensional printing apparatus of the exemplary embodiment includes a base, a printing head module and a control unit. The base has a carrying surface. The printing head module is disposed above the base. The printing head module includes a body and a discharge outlet switching component. The body includes a material supplying channel. The discharge outlet switching component is movably disposed at the body. The discharge outlet switching component includes a plurality of discharge outlets. Diameters of the discharge outlets are different from each other. The control unit is configured to choose one of the discharge outlets according to the diameters of the discharge outlets and connect the chosen discharge outlet to the body, such that the material supplying channel is connected to the chosen discharge outlet.

The printing head module of the exemplary embodiment includes a body and a discharge outlet switching component. The body includes a material supplying channel. The discharge outlet switching component is movably disposed at the body. The discharge outlet switching component includes a plurality of discharge outlets. Diameters of the discharge outlets are different from each other. The discharge outlet switching component is adapted to move each of the discharge outlets to a position corresponding to the body to connect the body, thereby connecting the material supplying channel to the chosen discharge outlet.

Based on above, the exemplary embodiment provides the discharge outlet switching component having multiple discharge outlets movably disposed at the body of the printing head module, and the diameters of the discharge outlets are different from each other. The control unit is configured to choose one of the discharge outlets according to the diameter of the discharge outlets and connect the chosen discharge outlet to the body of the printing head module, such that the material supplying channel of the body is connected to the discharge outlet. Accordingly, the control unit may control the resolution of the 3-D object by choosing the diameter of the discharge outlets. Therefore, when the three-dimensional printing apparatus prints the contour of the 3-D object, the discharge outlet having the smaller diameter may be chosen to increase the resolution of 3-D printing. When the three-dimensional printing apparatus prints the parts within the contour of the 3-D object, the discharge outlet having the larger diameter may be chosen to increase the output quantity of the base material since the high resolution of 3-D printing is not required, thereby improving the efficiency of 3-D printing.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the exemplary embodiments, and are incorporated in and constitute a part of this specification. The drawings illustrate embodiments and, together with the description, serve to explain the principles of the exemplary embodiments.

DESCRIPTION OF THE EMBODIMENTS

It is to be understood that both of the foregoing and other detailed descriptions, features, and advantages are intended to be described more comprehensively by providing embodiments accompanied with figures hereinafter. In the following embodiments, wordings used to indicate directions, such as "up," "down," "front," "back," "left," and "right", merely refer to directions in the accompanying drawings. Therefore, the directional wording is used to illustrate rather than limit the exemplary embodiments. Further, in each of following embodiments, the same or similar reference numbers represent the same or similar elements.

Figure 1:
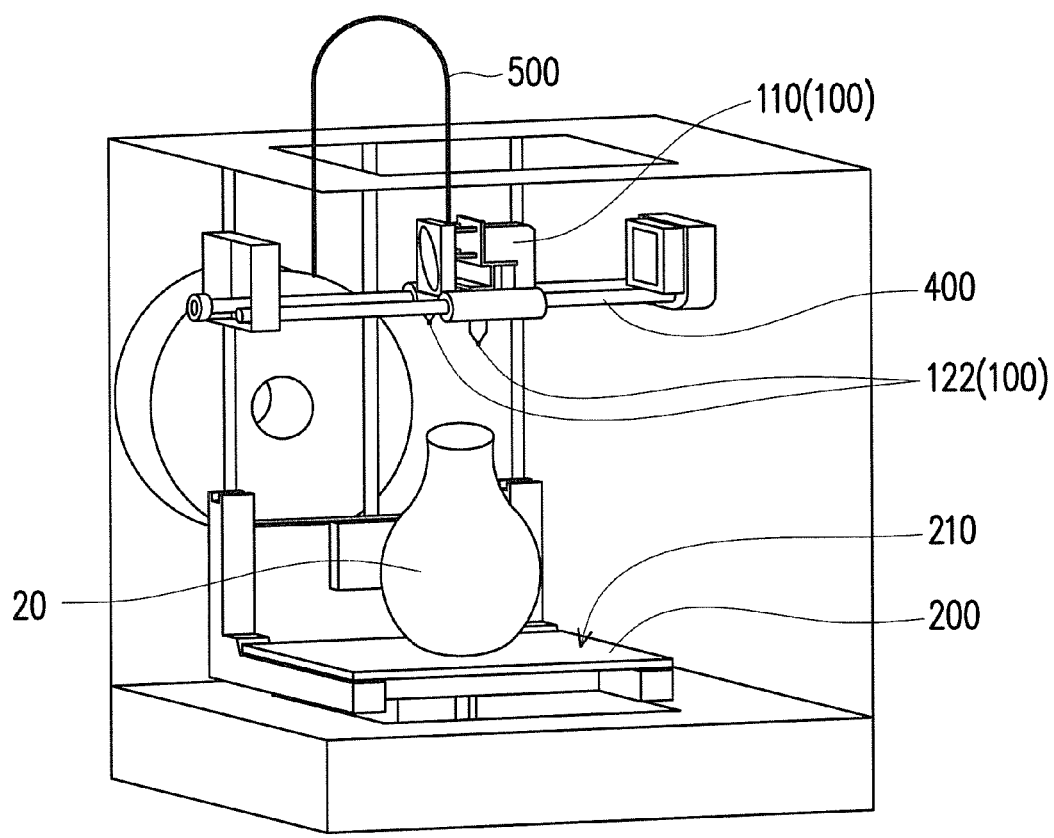
FIG. 1 is a schematic view of a three-dimensional printing apparatus according to an exemplary embodiment.
Figure 2:
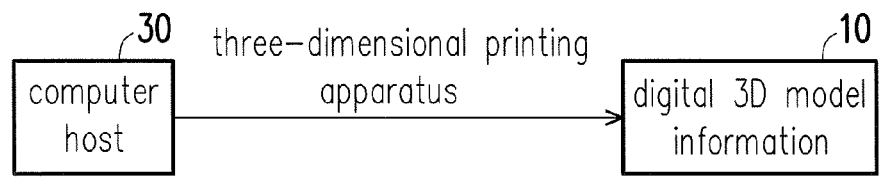
FIG. 2 is a schematic block view illustrating a usage situation of a three-dimensional printing apparatus according to an exemplary embodiment.
Figure 3:
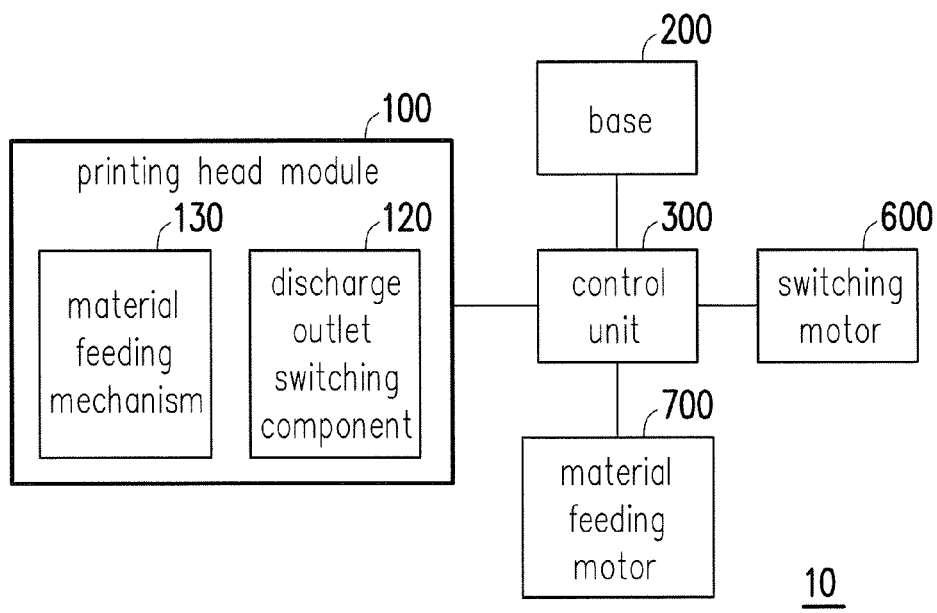
FIG. 3 is a schematic block view of a three-dimensional printing apparatus according to an exemplary embodiment.

FIG. 1 is a schematic view of a three-dimensional printing apparatus according to an exemplary embodiment. FIG. 2 is a schematic block view illustrating a usage situation of a three-dimensional printing apparatus according to an exemplary embodiment. FIG. 3 is a schematic block view of a three-dimensional printing apparatus according to an exemplary embodiment. Referring to FIG. 1 to FIG. 3, in the present embodiment, a three-dimensional printing apparatus 10 is adapted to print a 3-D object 20 according to a digital 3-D model information. The three-dimensional printing apparatus 10 includes a printing head module 100, a base 200 and a control unit 300. In the present embodiment, the control unit 300 is configured to read the digital 3-D model information. Therein, the digital 3-D model information may be a digital 3-D image file which is built by a computer host 30 using, for example, a computer-aided design (CAD) or an animation modeling software.

Further, the base 200 of the three-dimensional printing apparatus 10 includes a carrying surface 210 as shown in FIG. 1. The printing head module 100 is movably disposed above the base 200, and configured to slide back and forth along a skid rail 400, and the base 200 may also move relative to the printing head module 100. The control unit 300 is configured to read and process the digital 3-D model information, and coupled to the printing head module 100 and the base 200 to control movements of the printing head module 100 and the base 200. Accordingly, the control unit 300 may control the printing head module 100 to move along the skid rail 400 according to the digital 3-D model information, and the printing head module 100 may also be connected to a base material 500, so that the base material 500 may be dispensed layer-by-layer on the carrying surface 210 during the movement thereby forming a plurality of laminated material layers. The laminated material layers are stacked over one another to form the 3-D object 20.

In the present embodiment, the base material 500 may be various suitable materials fabricated through methods such as Stereolithography, Fused Filament Fabrication (FFF), Melted and Extrusion Modeling, and Electron Beam Modeling. For instances, the base material 500 may be hot melt filament adapted to be fabricated by Fused Filament Fabrication, and the base material 500 may be heated by, for example, a heating unit of the printing head module 100, so as to melt the base material 500 transmitted to a nozzle into a molten base material. Next, the molten base material is extruded and dispensed layer-by-layer on the carrying surface 210 to form the laminated material layers. Thereafter, processes such as curing and drying may be performed on the laminated material layers, so as to form the 3-D object 20.

Figure 4:
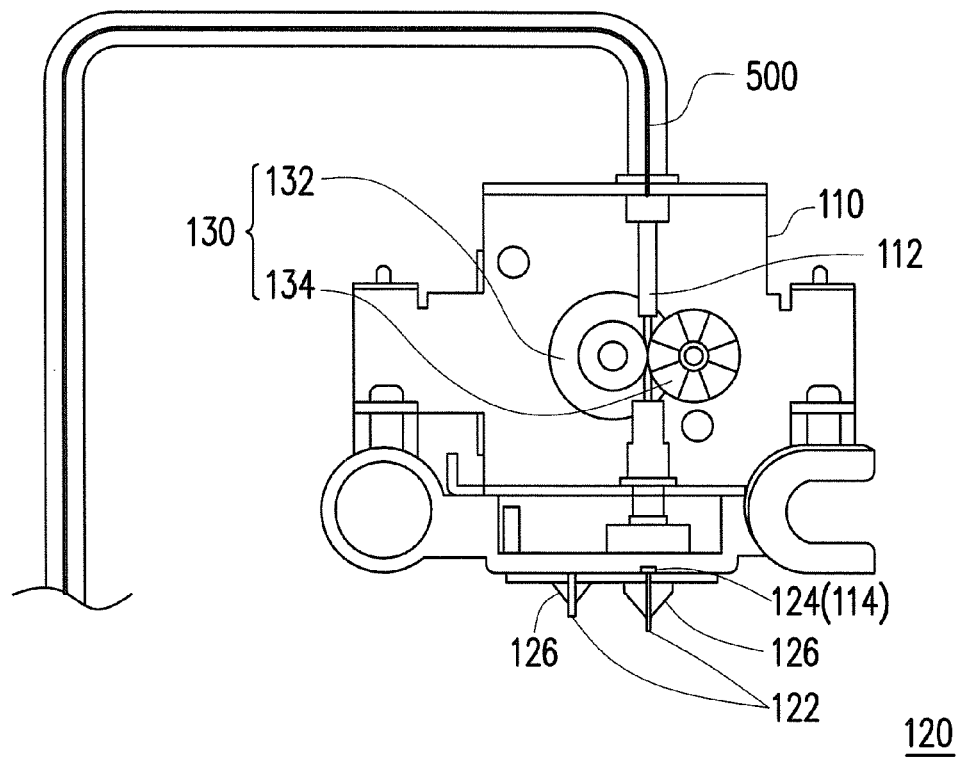
FIG. 4 is a schematic sectional view of a printing head module according to an exemplary embodiment.
Figure 5:
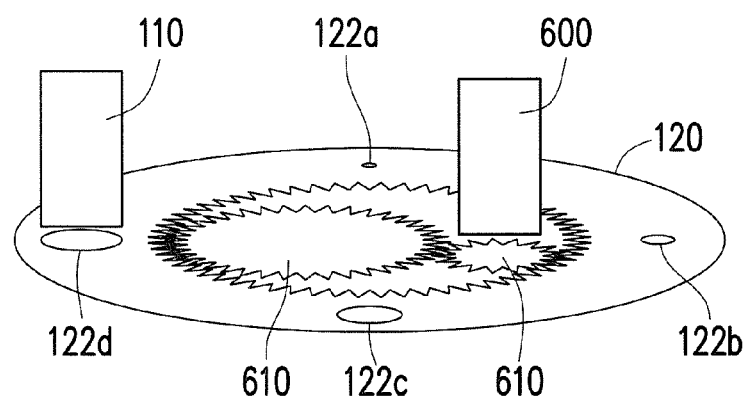
FIG. 5 is a schematic view illustrating a part of components in a three-dimensional printing apparatus according to an exemplary embodiment.
Figure 6:
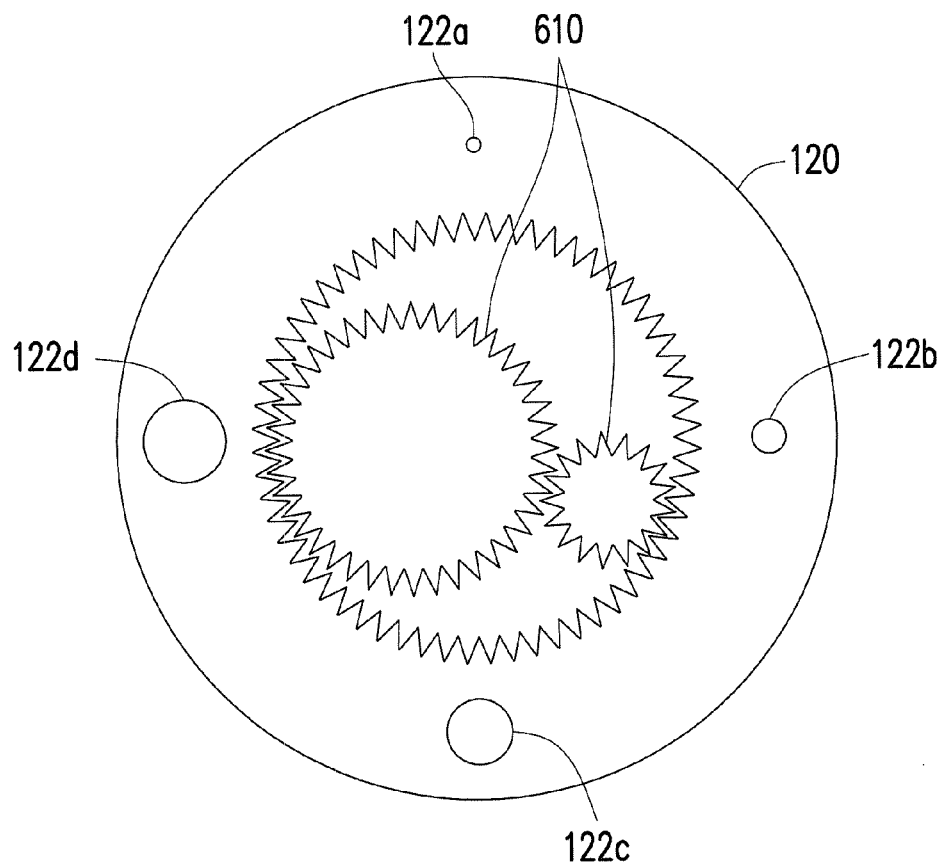
FIG. 6 is a schematic top view of the discharge outlet switching component depicted in FIG. 5.

FIG. 4 is a schematic sectional view of a printing head module according to an exemplary embodiment. FIG. 5 is a schematic view illustrating a part of components in a three-dimensional printing apparatus according to an exemplary embodiment. FIG. 6 is a schematic top view of the discharge outlet switching component depicted in FIG. 5. Referring to FIG. 4 to FIG. 6, in the present embodiment, the printing head module 100 includes a body 110 and a discharge outlet switching component 120. The body 110 includes a material supplying channel 112. The discharge outlet switching component 120 is movably disposed at the body 110. The discharge outlet switching component 120 includes a plurality of discharge outlets 122a, 122b, 122c, and 122d. Diameters of the discharge outlets 122a, 122b, 122c, and 122d are different from each other. For instance, as shown in FIG. 5, the diameter of the discharge outlet 122d is greater than the diameter of the discharge outlet 122a. The control unit 300 is configured to couple and control the discharge outlet switching component 120, choose one of the discharge outlets 122a, 122b, 122c, and 122d according to diameter of the discharge outlets 122a, 122b, 122c, and 122d, and connect the chosen discharge outlet 122a, 122b, 122c, or 122d to the body 110, such that the material supplying channel 112 may be connected to the chosen discharge outlet 122a, 122b, 122c, or 122d.

In the present embodiment, as shown in FIG. 4, the three-dimensional printing apparatus 10 may further include a plurality of nozzles 126 disposed at the discharge outlet switching component 120 and respectively sleeved on the corresponding discharge outlets 122a, 122b, 122c, and 122d, and a diameter of each of nozzles 126 is substantially identical to the diameter of the corresponding discharge outlet 122a, 122b, 122c, or 122d. In addition, according to another exemplary embodiment, the three-dimensional printing apparatus 10 may also include only a nozzle sleeved on the discharge outlet switching component 120, so that the discharge outlets 122a, 122b, 122c, and 122d are all located within the nozzle.

Generally, when the three-dimensional printing apparatus 10 prints a contour of the 3-D object 20, a required diameter of the discharge outlets 122a, 122b, 122c, and 122d may be relatively smaller to increase the resolution of 3-D printing, so that the printed 3-D object 20 may have a smoother surface. When the three-dimensional printing apparatus 10 prints the parts within the contour of the 3-D object 20, the nozzle 122 of the discharge outlets 122a, 122b, 122c, and 122d may include a relatively larger diameter to increase an output quantity of the base material 500 since the high resolution of 3-D printing is not required, thereby improving the efficiency of 3-D printing. In other words, the control unit 300 may control the resolution of the 3-D object 20 by choosing the diameters of the discharge outlets 122a, 122b, 122c, and 122d. More specifically, the control unit 300 may control the resolution required in current 3-D printing according to the digital modeling information associated with the 3-D object 20, choose one of the discharge outlets 122a, 122b, 122c, and 122d according to the diameters of the discharge outlets 122a, 122b, 122c, and 122d, and connect the chosen discharge outlet 122a, 122b, 122c, or 122d to the body 110, such that the material supplying channel 112 may be connected to the chosen discharge outlet 122a, 122b, 122c, or 122d.

In the present embodiment, the printing head module 100 may further include a material feeding mechanism 130 disposed at the body 110. After the chosen discharge outlet 122 is connected to the body 110, the control unit 300 may control the material feeding mechanism 130 to transmit the base material 500 to the discharge outlet 122 through the material supplying channel 112. More specifically, the material feeding mechanism 130 includes a driving roller 132 and a driven roller 134 disposed at opposite sides of the material supplying channel 112, respectively. The driving roller 132 drives the driven roller 134 to rotate together for driving the base to move, so as to transmit the base material 500 to the discharge outlet 122, and extrude the base material 500 through the discharge outlet 122 to be formed layer-by-layer on the carrying surface 210 for forming the 3-D object 20.

In the present embodiment, the discharge outlets 122a, 122b, 122c, and 122d may be arranged along a circle as shown in FIG. 5, and the control unit 300 controls the discharge outlet switching component 120 to rotate along a central axis A1 of the circle, so as to rotate the chosen discharge outlet 122a, 122b, 122c, or 122d to a position corresponding to the material supplying channel 112 to be connected to the body 110. The material supplying channel 112 is located on a rotating path of the discharge outlets 122a, 122b, 122c, and 122d. Further, the body 110 may include a first engaging part 114. The discharge outlet switching component 120 may include a plurality of second engaging parts 114 structurally coordinating the first engaging part 114, and each of the second engaging parts 124 may be disposed corresponding to each position of the discharge outlets 122a, 122b, 122c, and 122d. Accordingly, the control unit 300 may rotate the chosen discharge outlet 122a, 122b, 122c, or 122d to the position corresponding to the material supplying channel 112 by rotating the discharge outlet switching component 120. Meanwhile, the corresponding second engaging part 124 may be engaged with the first engaging part 114, so as to fix the chosen discharge outlet 122a, 122b, 122c, or 122d on the body 110. As a result, switching of the discharge outlets 122a, 122b, 122c, and 122d is completed by the three-dimensional printing apparatus 10.

Referring to FIG. 3, FIG. 5, and FIG. 6 together, in the present embodiment, the discharge outlets 122a, 122b, 122c, and 122d may be arranged along a circle as shown in FIG. 6. More specifically, in the present embodiment, the three-dimensional printing apparatus 10 further include a switching motor 600, a linking-up roller set 610 and a material feeding motor 700. The control unit 300 respectively couples and controls the switching motor 600 and the material feeding motor 700 as shown in FIG. 3, whereas the switching motor 600 connects to the linking-up roller set 610 as shown in FIG. 6 to drive the linking-up roller set 610 to rotate. The linking-up roller set 610 is connected to the discharge outlet switching component 120 to drive the discharge outlet switching component 120 to move along an arranging direction of the discharge outlets 122a, 122b, 122c, and 122d, so as to rotate the chosen discharge outlet 122a, 122b, 122c, or 122d to a position corresponding to the material supplying channel 112 to connect the body 110. In other words, after the one of the discharge outlets 122a, 122b, 122c, or 122d is chosen according to the diameters of the discharge outlets 122a, 122b, 122c, and 122d, the control unit 300 controls the switching motor 600 to drive the linking-up roller set 610 to rotate, for driving the discharge outlet switching component 120 to rotate along the arranging direction of the discharge outlets 122a, 122b, 122c, and 122d, so as to move the chosen discharge outlet 122a, 122b, 122c, or 122d to the position corresponding to the material supplying channel 112 to be connected to the body 110. After the chosen discharge outlet 122a, 122b, 122c, or 122d is connected to the body 110, the control unit 300 may control the material feeding motor 700 to transmit the base material 500 to the chosen discharge outlet 122a, 122b, 122c, or 122d through the material supplying channel 112, thereby dispensing the base material 500 layer-by-layer on the base to form the 3-D object.

Figure 7:
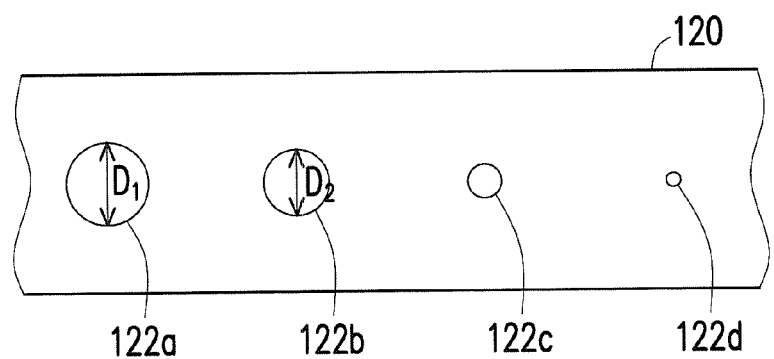
FIG. 7 is a schematic top view of a discharge outlet switching component according to an exemplary embodiment.
Figure 8:
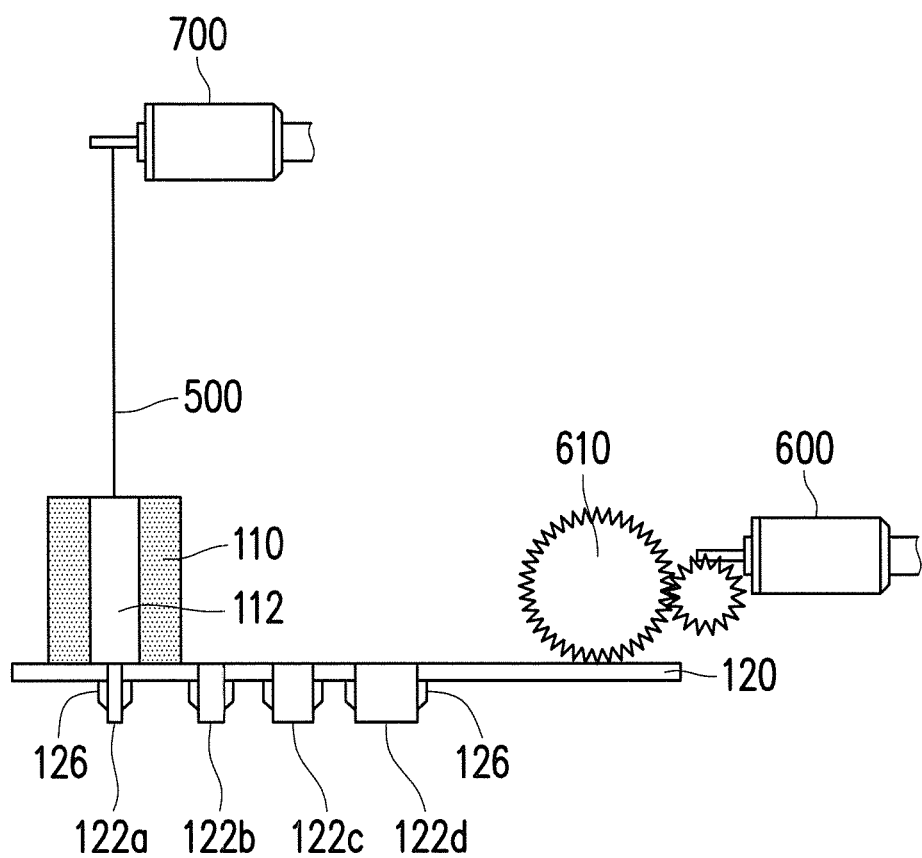
FIG. 8 is a schematic sectional view illustrating a part of components in a three-dimensional printing apparatus according to an exemplary embodiment.

FIG. 7 is a schematic bottom view of a discharge outlet switching component according to an exemplary embodiment. FIG. 8 is a schematic sectional view illustrating a part of components in a three-dimensional printing apparatus according to an exemplary embodiment. It should be noted that, the discharge outlet switching component 120 of the present embodiment is similar to the discharge outlet switching component 120 depicted in FIG. 5. Therefore, the reference numerals and a part of the contents in the previous embodiment are used in the present embodiment, in which identical reference numerals indicate identical or similar components, and repeated description of the same technical contents is omitted. For a detailed description of the omitted parts, reference can be found in the previous embodiment, and no repeated description is contained in the present embodiment. Differences between the discharge outlet switching component 120 of the present embodiment and the discharge outlet switching component 120 depicted in FIG. 5 are described as follows.

Referring to FIG. 3, FIG. 7, and FIG. 8 together, in the present embodiment, the discharge outlets 122a, 122b, 122c, and 122d may be arranged along a straight line as shown in FIG. 7, and the diameters of the discharge outlets 122a, 122b, 122c, and 122d are different from each other. For instance, as shown in FIG. 7, a diameter D1 of the discharge outlet 122a is greater than a diameter D2 of the discharge outlet 122b. The control unit 300 may control the discharge outlet switching component 120 to move along the straight line, so as to move the discharge outlets 122a, 122b, 122c, or 122d chosen by the control unit 300 to a position corresponding to the material supplying channel 112 to be connected to the body 110. The material supplying channel 112 is located on a moving path of the discharge outlets 122a, 122b, 122c, and 122d. Further, the body 110 may include a first engaging part 114 as shown in FIG. 4. The discharge outlet switching component 120 may include a plurality of second engaging parts 114 structurally coordinating the first engaging part 1014, and each of the second engaging parts 124 may be disposed corresponding to each of the discharge outlets 122a, 122b, 122c, and 122d. Accordingly, the control unit 300 may move the chosen discharge outlet 122a, 122b, 122c, or 122d to the position corresponding to the material supplying channel 112 by straightly moving the discharge outlet switching component 120. Meanwhile, the corresponding second engaging part 124 may be engaged with the first engaging part 114, so as to fix the chosen discharge outlet 122a, 122b, 122c, or 122d on the body 110. As a result, switching of the discharge outlets 122a, 122b, 122c, and 122d is completed by the three-dimensional printing apparatus 10.

Referring to FIG. 3, FIG. 7, and FIG. 8 together, in the present embodiment, the discharge outlets 122a, 122b, 122c, and 122d may be arranged in a straight line as shown in FIG. 7. More specifically, in the present embodiment, the three-dimensional printing apparatus 10 further include a switching motor 600, a linking-up roller set 610 and a material feeding motor 700. The control unit 300 respectively couples and controls the switching motor 600 and the material feeding motor 700, whereas the switching motor 600 connects to the linking-up roller set 610 as shown in FIG. 8 to drive the linking-up roller set 610 to rotate. The linking-up roller set 610 is connected to the discharge outlet switching component 120 to drive the discharge outlet switching component 120 to move straightly along an arranging direction of the discharge outlets 122a, 122b, 122c, and 122d, so as to move the chosen discharge outlet 122a, 122b, 122c, or 122d to a position corresponding to the material supplying channel 112 to connect the body 110. In other words, after the one of the discharge outlets 122a, 122b, 122c, and 122d is chosen according to the diameters of the discharge outlets 122, the control unit 300 controls the switching motor 610 to drive the linking-up roller set 610 to rotate, for driving the discharge outlet switching component 120 to move straightly along the arranging direction of the discharge outlets 122a, 122b, 122c, and 122d, so as to move the chosen discharge outlet 122a, 122b, 122c, or 122d to the position corresponding to the material supplying channel 112 to connect the body 110. After the chosen discharge outlet 122a, 122b, 122c, or 122d is connected to the body 110, the control unit 300 may control the material feeding motor 700 to deliver the base material 500 to the chosen discharge outlet 122a, 122b, 122c, or 122d through the material supplying channel 112, thereby dispensing the base material 500 layer-by-layer on the base to form the 3-D object.

In view of above, the exemplary embodiment provides the discharge outlet switching component having the discharge outlets movably disposed at the body of the printing head module in which the diameters of the discharge outlets are different from each other. The control unit is configured to choose one of the discharge outlets according to the diameters and connect the chosen discharge outlet to the body of the printing head module, such that the material supplying channel of the body is connected to the discharge outlet. Accordingly, the control unit may control the resolution required in current 3-D printing according to the digital 3-D model information associated with the 3-D object, choose one the discharge outlets according to the diameters of the discharge outlets, and connect the chosen discharge outlet to the material supplying channel of the body, so that the base material may be extruded through the chosen discharge outlet to be dispensed layer-by-layer on the base for forming the 3-D object. In other words, the control unit may control the resolution of the 3-D object by choosing the diameters of the discharge outlets.

Therefore, when the three-dimensional printing apparatus prints the contour of the 3-D object, the discharge outlet having the smaller diameter may be chosen to increase the resolution of 3-D printing. When the three-dimensional printing apparatus prints the parts within the contour of the 3-D object, the discharge outlet having the larger diameter may be chosen to increase the output quantity of the base material since the high resolution of 3-D printing is not required, thereby improving the efficiency of 3-D printing. As a result, the exemplary embodiment is capable of improving the printing efficiency of three-dimensional printing apparatus while maintaining printing quality and printing resolution.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A three-dimensional printing apparatus, comprising:
   a base, having a carrying surface;
   a printing head module, disposed above the base, and the printing head module comprising:
      a body, comprising a material supplying channel; and
      a discharge outlet switching component movably disposed at the body, the discharge outlet switching component comprising a plurality discharge outlets, and diameters of the discharge outlets being different from each other; and
   a control unit, coupling and controlling the discharge outlet switching component, and configured to choose one of the discharge outlets according to the diameters of the discharge outlets and connect the chosen discharge outlet to the body, thereby the material supplying channel is connected to the chosen discharge outlet.

2. The three-dimensional printing apparatus of claim 1, wherein the discharge outlets are arranged along a circle.

3. The three-dimensional printing apparatus of claim 2, wherein the control unit controls the discharge outlet switching component to rotate about a center axis of the circle, so as to rotate the chosen discharge outlet to a position corresponding to the material supplying channel to be connected to the body.

4. The three-dimensional printing apparatus of claim 1, wherein the discharge outlets are arranged along a straight line.

5. The three-dimensional printing apparatus of claim 4, wherein the control unit controls the discharge outlet switching component to move along the straight line, so as to move the chosen discharge outlet to a position corresponding to the material supplying channel to be connected to the body.

6. The three-dimensional printing apparatus of claim 4, further comprising a switching motor and a linking-up roller set, the control unit coupling and controlling the switching motor, the switching motor connecting the linking-up roller set to drive the linking-up roller set to rotate, the linking-up roller set connecting the discharge outlet switching component to drive the discharge outlet switching component to move along the straight line to move the chosen discharge outlet to a position corresponding to the material supplying channel to be connected to the body.

7. The three-dimensional printing apparatus of claim 1, further comprising a material feeding motor coupled to the control unit, wherein after the control unit connects the chosen discharge outlet to the body, the control unit controls the material feeding motor to transmit a base material to the chosen discharge outlet through the material supplying channel.

8. The three-dimensional printing apparatus of claim 1, wherein the body comprises a first engaging part, and the discharge outlet switching component further comprises a plurality of second engaging parts each disposed corresponding to each of the discharge outlets, such that the corresponding second engaging parts is engaged with the first engaging part when the control unit connects the chosen discharge outlet to the body.

9. The three-dimensional printing apparatus of claim 1, further comprising a plurality of nozzles disposed at the discharge outlet switching component and respectively sleeved on the discharge outlets, wherein a diameter of each of nozzles is substantially identical to the diameter of the corresponding discharge outlet.

10. The three-dimensional printing apparatus of claim 1, further comprising a nozzle sleeved on the discharge outlet switching component so that the discharge outlets are located within the nozzle.

11. A printing head module, comprising:
a body, comprising a material supplying channel;
a discharge outlet switching component, movably disposed at the body, the discharge outlet switching component comprising a plurality discharge outlets, and diameters of the discharge outlets being different from each other, and the discharge outlet switching component being adapted to move each of the discharge outlets to a position corresponding to the body to connect the body, thereby connecting the material supplying channel to the corresponding discharge outlet; and
a material feeding motor coupled to a control unit, wherein after the control unit connects the chosen discharge outlet to the body, the control unit controls the material feeding motor to transmit a base material to the chosen discharge outlet through the material supplying channel.

12. The printing head module of claim 11, wherein the discharge outlets are arranged along a circle.

13. The printing head module of claim 12, wherein the discharge outlet switching component is adapted to rotate about a center axis of the circle, so as to rotate each of the discharge outlets to a position corresponding to the material supplying channel to be connected to the body.

14. The printing head module of claim 12, further comprising a switching motor and a linking-up roller set, the control unit coupling and controlling the switching motor, the switching motor connecting the linking-up roller set to drive the linking-up roller set to rotate, the linking-up roller set connecting the discharge outlet switching component to drive the discharge outlet switching component to move along the circle to move the chosen discharge outlet to a position corresponding to the material supplying channel to be connected to the body.

15. The printing head module of claim 11, wherein the discharge outlets are arranged along a straight line.

16. The printing head module of claim 15, wherein the discharge outlet switching component is adapted to move along the straight line, so as to move each of the discharge outlets to a position corresponding to the material supplying channel to be connected to the body.

17. The printing head module of claim 15, further comprising a switching motor and a linking-up roller set, the control unit coupling and controlling the switching motor, the switching motor connecting the linking-up roller set to drive the linking-up roller set to rotate, the linking-up roller set connecting the discharge outlet switching component to drive the discharge outlet switching component to move along the straight line to move the chosen discharge outlet to a position corresponding to the material supplying channel to be connected to the body.

18. The printing head module of claim 11, wherein the body comprises a first engaging part, and the discharge outlet switching component further comprises a plurality of second engaging parts each disposed corresponding to each of the discharge outlets, such that the corresponding second engaging parts is engaged with the first engaging part when the corresponding discharge outlet is connected to the body.

19. The printing head module of claim 11, further comprising a plurality of nozzles disposed at the discharge outlet switching component and respectively sleeved on the corresponding discharge outlet, wherein a diameter of each of nozzles is substantially identical to the diameter of the corresponding discharge outlet.

20. The printing head module of claim 11, further comprising a nozzle sleeved on the discharge outlet switching component so that the discharge outlets are located within the nozzle.

21. A three-dimensional printing apparatus, comprising:
a base, having a carrying surface;
a printing head module, disposed above the base, and the printing head module comprising:
a body, comprising a material supplying channel; and
a discharge outlet switching component movably disposed at the body, the discharge outlet switching component comprising a plurality discharge outlets, and diameters of the discharge outlets being different from each other, wherein the discharge outlets are arranged along a circle; and
a control unit, coupling and controlling the discharge outlet switching component, and configured to choose one of the discharge outlets according to the diameters of the discharge outlets and connect the chosen discharge outlet to the body, thereby the material supplying channel is connected to the chosen discharge outlet.

22. The three-dimensional printing apparatus of claim 21, wherein the printing head module further comprising a switching motor and a linking-up roller set, the control unit coupling and controlling the switching motor, the linking-up roller set disposed at a center region of the discharge outlet switching component, the switching motor connecting the linking-up roller set to drive the linking-up roller set to rotate, the linking-up roller set connecting the discharge outlet switching component to drive the discharge outlet switching component to rotate along the circle to move the chosen discharge outlet to a position corresponding to the material supplying channel to be connected to the body.

23. A printing head module, comprising:
a body, comprising a material supplying channel;
a discharge outlet switching component, movably disposed at the body, the discharge outlet switching component comprising a plurality discharge outlets, and diameters of the discharge outlets being different from each other, and the discharge outlet switching component being adapted to move each of the discharge outlets to a position corresponding to the body to connect the body, thereby connecting the material supplying channel to the corresponding discharge outlet, wherein the discharge outlets are arranged along a circle; and
a switching motor and a linking-up roller set, a control unit coupling and controlling the switching motor, the linking-up roller set disposed at a center region of the discharge outlet switching component, the switching motor connecting the linking-up roller set to drive the linking-up roller set to rotate, the linking-up roller set connecting the discharge outlet switching component to drive the discharge outlet switching component to rotate along the circle to move the chosen discharge outlet to a position corresponding to the material supplying channel to be connected to the body.

* * * * *